Aug. 5, 1924.
S. C. BEALE
BEET HARVESTING MACHINE
Filed Nov. 17, 1920    5 Sheets-Sheet 4
1,503,625
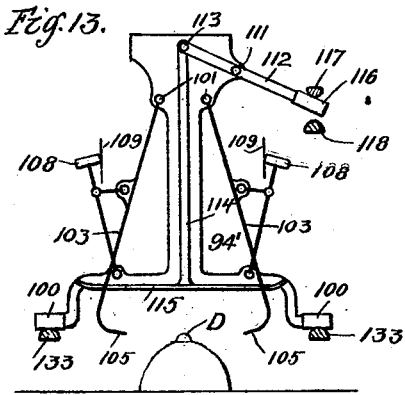
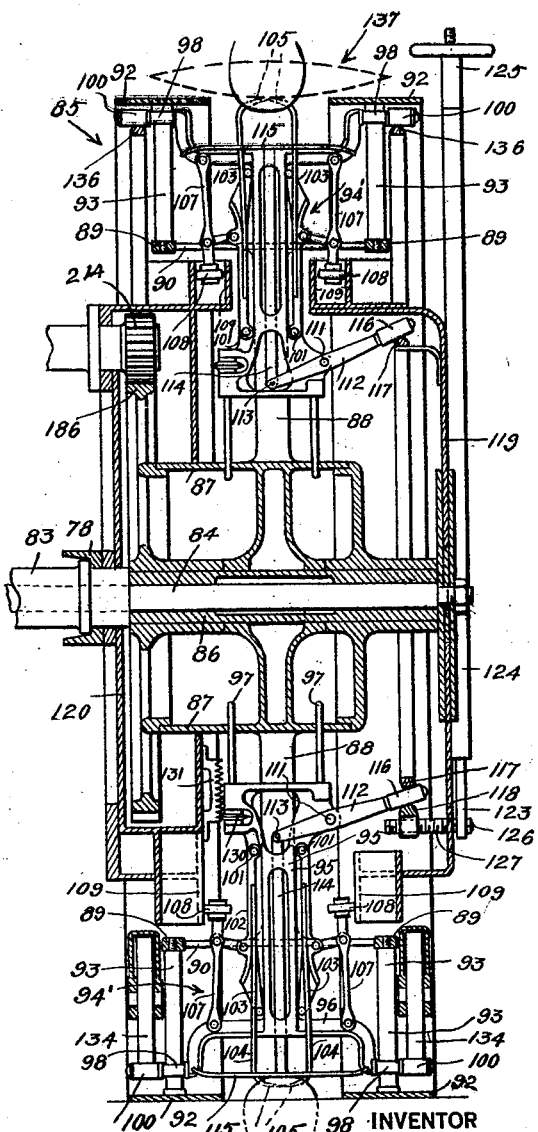
INVENTOR
Samuel C. Beale
BY
Edmund A. Strauss
ATTORNEY

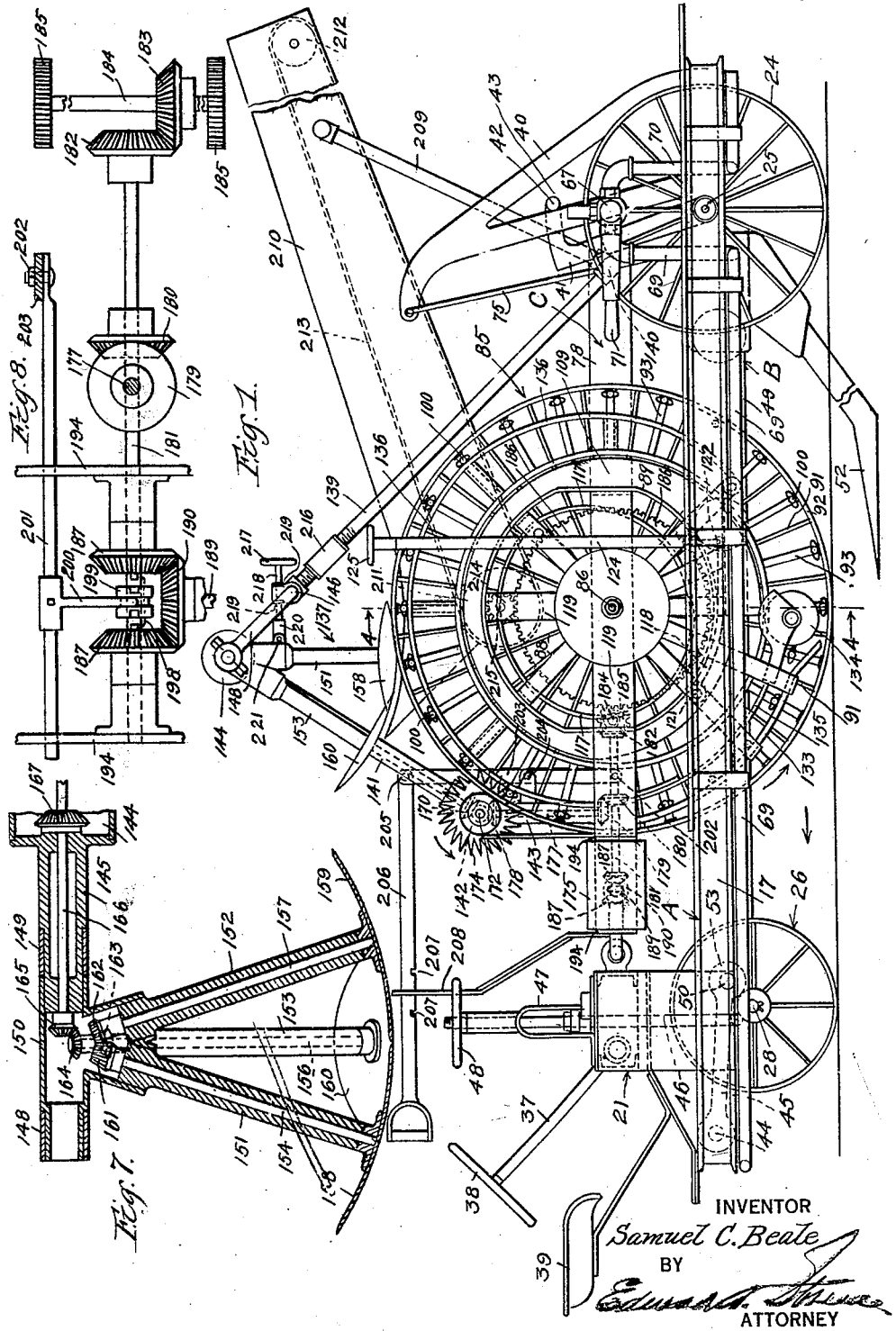

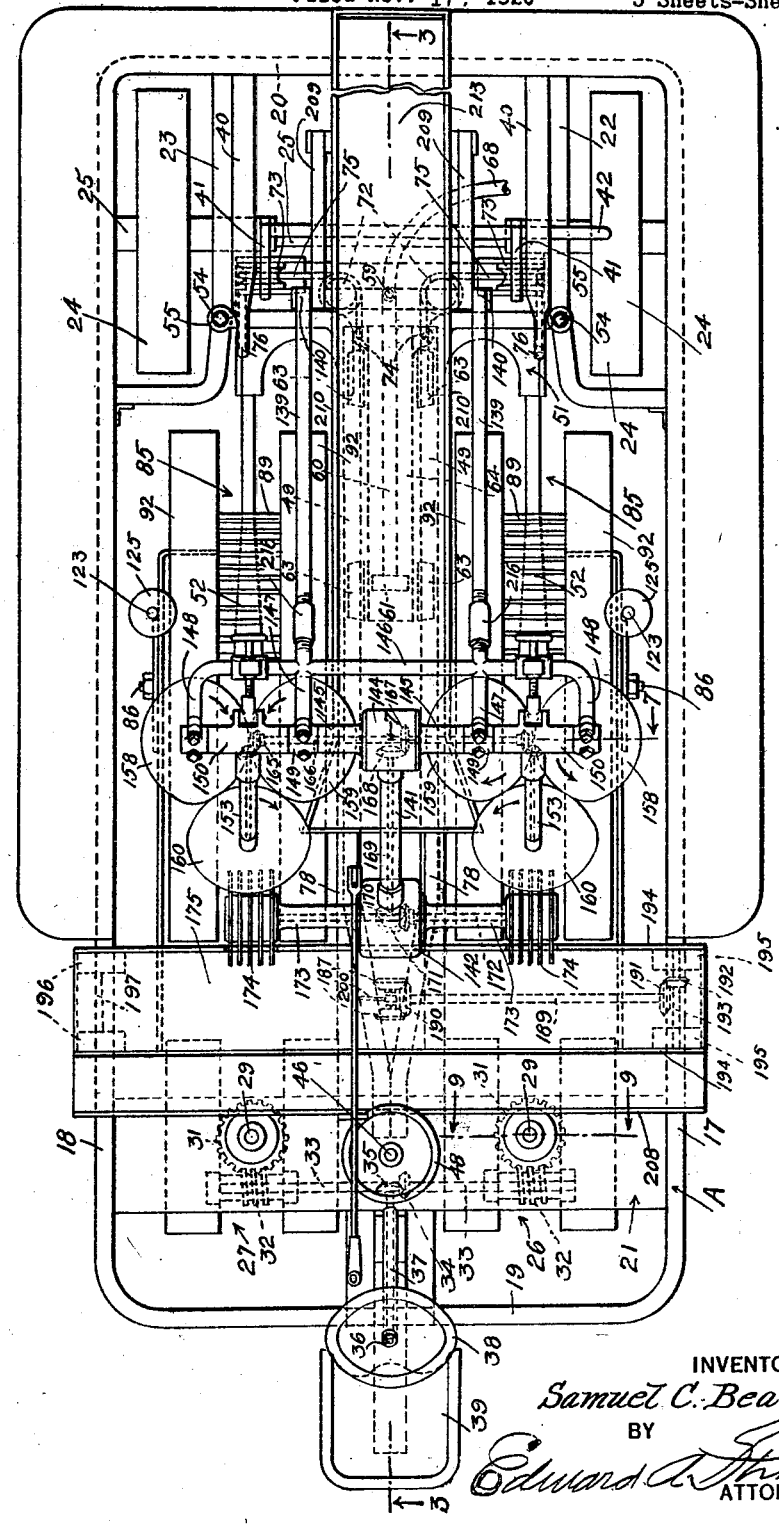

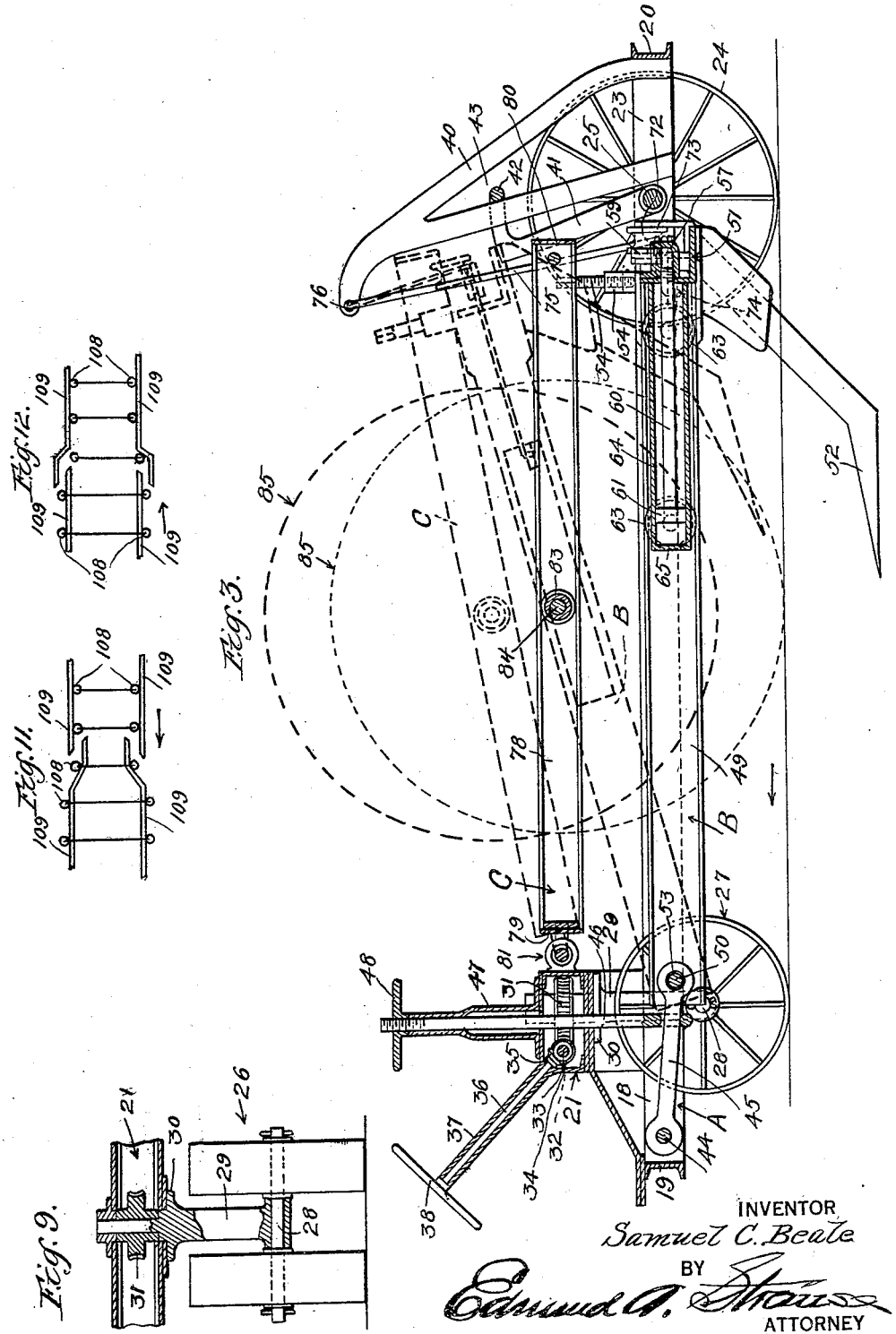

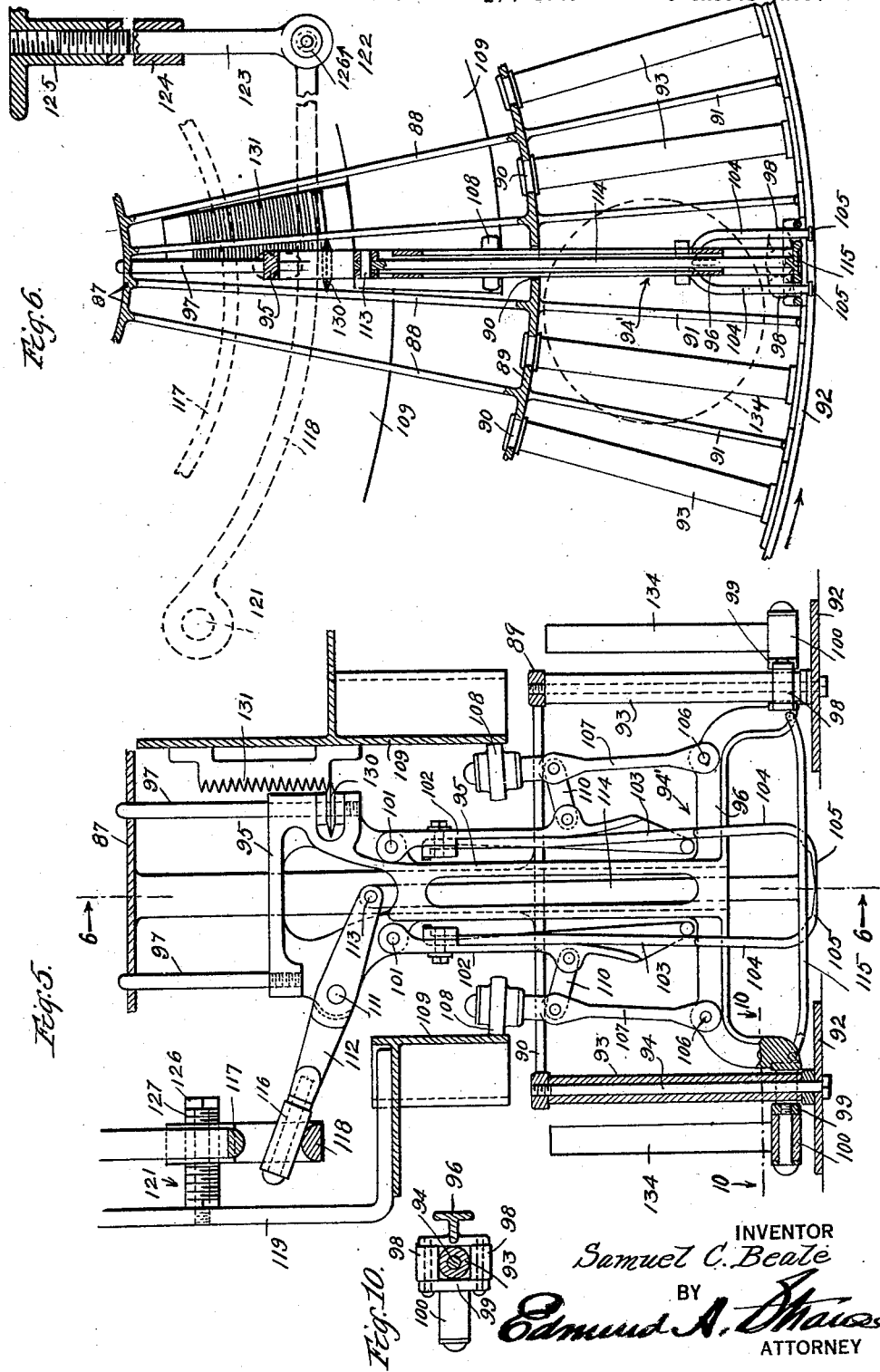

Patented Aug. 5, 1924.

1,503,625

UNITED STATES PATENT OFFICE.

SAMUEL C. BEALE, OF LOS ANGELES, CALIFORNIA, ASSIGNOR TO HORATIO J. FORGY, TRUSTEE, OF SANTA ANA, CALIFORNIA.

BEET-HARVESTING MACHINE.

Application filed November 17, 1920. Serial No. 424,761.

*To all whom it may concern:*

Be it known that I, SAMUEL C. BEALE, a citizen of the United States, residing at Los Angeles, in the county of Los Angeles and State of California, have invented new and useful Improvements in Beet-Harvesting Machines, of which the following is a specification.

This invention has relation to a machine for harvesting sugar beets, and more specifically to improvements in my beet harvesting machine as illustrated and described in my pending application for Letters Patent filed May 5th, 1919, bearing Serial Number 294,899, renewed December 12, 1921, bearing Ser. No. 521,924 entitled Beet harvesting machines. In said application is shown and described a beet harvester of the same general type as my present invention, which, briefly, provides means for pulling beets out of the ground after they have been loosened by a plow, while passing over a row, and carrying them to topping knives where the tops are severed from the body portion.

In the application above referred to, I have shown and described a machine which will grip the beets proportionately to that part which projects above the ground, pull them therefrom and deliver the same to a topping mechanism which automatically tops them in such proportion; in this structure, however, no means are provided for changing the proportion without supplying an entire new set of gripping and pulling devices.

It is the main object of my present invention to provide a machine for the purpose above set forth, which may be quickly and efficiently adjusted, so that the beets may be topped with respect to any desired proportion of that part which projects above the ground, without stopping its operation or substituting new parts.

The above and other objects, including improved means for adjusting the topping mechanism, handling and disposing of the beets and beet tops, regulating the projecting of the plow in the ground, and lifting and holding the beet-pulling mechanism and plow free from the ground when the machine is being transported from one field to another, or when turning, will be more fully disclosed in the following description, will be pointed out in the claims, and will be embodied in the accompanying drawings, in which:

Fig. 1 is a side elevation of a beet harvesting machine embodying my improvements, the beet-pulling devices being only illustrated conventionally, due to the small scale on which the drawing is made.

Fig. 2 is a plan view of the same.

Fig. 3 is a longitudinal section through the machine, taken on the line 3—3 of Fig. 2, some of the mechanism being omitted, illustrating in dotted lines the frame upon which the gripping and pulling mechanisms are mounted, and the plow in an elevated and inoperative position, some of the parts being omitted to avoid repetition.

Fig. 4 is an enlarged vertical transverse section through one of the wheels supporting the beet pulling mechanism, taken on the line 4—4 of Fig. 1, showing the gripping and pulling mechanism mounted thereon in operative position, viewed in the direction indicated by the arrows.

Fig. 5 is an enlargement of the lower part of Fig. 4, taken approximately on the same line, viewed in the opposite direction, showing the picking and pulling mechanism in a different position.

Fig. 6 is a fragmental section, taken on the line 6—6 of Fig. 5.

Fig. 7 is an enlarged detail section, taken on the line 7—7 of Fig. 2.

Fig. 8 is an enlarged detail plan view of the gearing for operating the beet top conveying apron, and other mechanism.

Fig. 9 is a section taken on the line 9—9 of Fig. 2.

Fig. 10 is a section taken on the line 10—10 of Fig. 5.

Fig. 11 is a diagram showing how the cam plates are arranged to cause the beet gripping jaws to open.

Fig. 12 is a diagram showing how the cam plates are arranged to cause the beet gripping jaws to close and grasp a beet.

Fig. 13 is a diagrammatic view illustrating the beet gripping mechanism in a normal and inactive or starting position.

Fig. 14 is a similar view illustrating an advanced step of the beet gripping mechanism in the act of becoming adjusted to a beet in the ground.

Fig. 15 is a similar view illustrating the final step in the adjustment of the gripping jaws with respect to a beet, in full lines, and in dotted lines the gripping jaws after they have been projected into the beet.

The machine is designed to harvest two rows of beets at a time, and is made up of three groups of mechanism, a truck A, which is adapted to be drawn over the field in the direction indicated by the arrow, preferably by means of a tractor (not shown) to which it may be attached in any suitable manner; a plow supporting frame B which is attached to the truck A and adapted to move in unison therewith; and a frame C which is also attached to the truck A and is adapted to support the beet gripping, pulling, topping and conveying mechanisms.

The truck A comprises a rectangular frame preferably made of channel iron and having the side bars 17 and 18 and the end bars 19 and 20, and at its front portion a transverse frame or housing 21 and at its rear corners the brace bars 22 and 23. The rear wheels 24 are adapted to revolve on a non-rotatable axle 25 secured to the side bars 17 and 18, and two pairs of front steering wheels 26 and 27 serve to support the front end of the truck frame A.

Each pair of the steering wheels 26 and 27 is adapted to rotate on a spindle 28, which is secured to the lower end of a standard 29, which is journaled in the frame or housing 21, and is provided adjacent its top end with a flange 30, which abuts against the lower surface of housing 21 to form a turntable. Secured to the upper end of each of the standards 29 is a worm wheel 31 enclosed in the housing 21 and adapted to engage with the worms 32 secured to a shaft 33 journaled in bearings in said housing. The shaft 33 is provided with a miter gear 34, which meshes with a miter gear 35 secured to the end of a shaft 36 journaled in a bearing 37 secured to the housing 21; and mounted on the end of said shaft is a hand steering wheel 38, which is arranged adjacent the operator's seat 39 supported on frame A. By the foregoing described arrangement it will be obvious that the operator may readily and conveniently control the direction of movement of the truck with relation to the rows of beets.

Rigidly secured to brace members 22 and 23 of the truck frame, and at the rear thereof, are two oppositely disposed upwardly extending arms 40, the lower ends of said arms which are secured to the brace members being bifurcated. Hinged to axle 25 are latch members 41, which are joined together by a handle bar 42, that is disposed in the spaces 43 formed by the lower bifurcated ends of arms 40, in order that their movement may be limited.

Pivoted to the front end of truck frame A at 44, is one end of a rearwardly extending link 45 and adapted to encompass said link is an eyebolt 46, which extends upwardly through apertures in housing 21 and an extension 47 mounted thereon. The end of said eyebolt 46 is threaded and has engaged therewith a wheel handle 48 which rests upon the top of extension 47.

The plow supporting frame B comprises a pair of oppositely disposed parallel channel irons 49, which are joined together at their front ends by means of a bolt 50, and at their rear ends by means of a suitable fitting 51, to which are secured the plow members 52, one for each of the two rows of beets. The frame B is hinged to the free end of link 45 by means of the bolt 50 passing through the eye 53 in said link, and is consequently drawn along by truck A, and may be raised or lowered with respect to frame A and the ground at its front end by an adjustment of the eyebolt 46; and may be raised or lowered at its rear end by an adjustment of the set screws 54, which are threaded into ears 55 on fitting 51, the ends of which rest upon the brace bars 23 secured to truck A. By this arrangement it will be seen that the plow members may be adjusted to project into the ground to any desired depth, and the points of said plow members may be tilted at a desired angle to suit various sizes of beets and soil conditions.

The fitting 51 is provided with a suitable socket member 57 into which is screwed an upstanding pipe 59 and a horizontally disposed pipe 60, which projects forwardly between the channel irons 49 and in parallel relation therewith, and has secured at its forward end a piston 61, said pipe extending through said piston and being open at its end. Mounted to surround the piston 61 and to be guided between the channel irons 49 by means of the wheels 63, is a cylinder 64 which is closed at its forward end 65. The pipe 59 is connected to a valve 67 by means of a flexible hose 68 (shown only in Fig. 2 of the drawings) and said valve has leading thereto a compressed air supply pipe 69, which extends forwardly and is connected with a compressed air reservoir mounted on the tractor (not shown); and has leading therefrom an exhaust pipe 70, and is provided with a handle 71.

Mounted on the fitting 51 are the idler pulleys 72 and 73 and secured to each side of the cylinder 64 at 74 are cables 75, which pass over the idler pulleys 72 and 73 and are secured at 76 to the top ends of crane members 40.

By the foregoing recited construction it will be seen that by a proper manipulation of the valve handle 71 of valve 69 compressed air may be admitted through flexible conduit 68 into pipe 60, through said pipe into the space between piston head 61 and the cylinder head 65. When the air is thus admitted, the cylinder 64 will be caused to move forwardly in the angle irons 49 and thereby serve to move the rear end of the frame B upwardly, the front end of said frame pivoting on bolt 50. During this movement the fitting 51 engages with latch 41, and when said fitting reaches the top thereof, said latch will fall underneath the fitting and thereby permanently hold the frame B and the plow members 52 up above the ground, as shown in dotted lines in Fig. 3. When it is desired to lower the frame, the air from cylinder 64 may be exhausted through pipe 70 by proper manipulation of the handle 71 on valve 67, and the latch 41 swung away from underneath the fitting 51, the frame B will thereby descend by force of gravity.

The frame C comprises a pair of oppositely disposed channel irons 78 arranged in parallel relation and secured together at their ends by means of bars 79 and 80, and said frame is secured at its front end to truck frame A by means of a universal joint 81. Interposed between the channel irons 78 at a point approximately midway between its ends, is a sleeve 83 through which extends a stud bolt 84, the ends of which project beyond the outer surfaces of said channel irons, as more clearly shown in Fig. 4 of the drawings, said stud bolt being secured against rotation by any suitable means.

Journaled on the stud bolt ends 84 are the beet pulling mechanism supporting wheels 85, one for each of the two rows of beets to be operated upon, and as these wheels are identical in construction, a description of one will suffice for the other.

The wheel 85 comprises a hub 86 adapted to rotate on the stud bolt 84. Mounted on said hub is a drum 87 from which radiate a plurality of spokes 88 and mounted on the outer ends thereof is another drum 89 provided on its periphery with a plurality of transverse slots 90. Extending radially and outwardly from the drum 89 and arranged adjacent its edges are the oppositely disposed spokes 91, upon which are secured the wheel rims 92, which are oppositely disposed and spaced suitably apart, as more clearly shown in Fig. 4 of the drawings. Arranged between the spokes 91 and extending from the drum 89 to the rim 92 are the oppositely disposed sleeves 93, which are held in position by means of the bolts 94.

Mounted to reciprocate radially between the wheel rim members 92 and each oppositely disposed pair of sleeves 93, and in slots 90, is a frame 94', which comprises an inwardly extending portion 95 and an outwardly extending arched cross bar 96. The frame 94' is guided at its inner end by means of the pins 97 which are secured thereto and project through apertures in the drum 87, and at its outer end by means of rollers 98 which are secured to the ends of cross bar 96 and engage on opposite sides of sleeves 93; and secured to the opposite ends of the studs of each pair of said rollers is a bar 99 upon which the actuating rollers 100 are mounted.

Pivoted at 101 to the inwardly extending portion 95 of frame 94' are the outwardly extending oppositely disposed members 102, to which are secured the gripping and pulling members 103. Members 103 are preferably formed of round spring bar steel and at their outer ends are bifurcated as at 104, said ends being turned inwardly and formed into beet piercing jaws 105. Pivoted to cross bar 96 at 106 are inwardly extending levers 107, which are provided on their inner ends with rollers 108 adapted to engage with cam plates 109, said levers 107 being connected to members 102 by means of links 110. By this arrangement it will be seen that as the rollers 108 roll along the cam plates 109, the gripping and pulling members 103 will be actuated to open and close the piercing jaws 105.

Pivoted at 111 to the frame 94' is a lever 112, one end of said lever projecting inwardly towards the portion 95 and having pivoted thereto at 113 an outwardly extending rod 114 which passes through a socket in member 95 and extends beyond the cross bar 96 and has secured to its end a presser foot 115, said presser foot being preferably in the form of a grid, as more clearly shown in Fig. 6 of the drawings, through openings in which the members 104 are adapted to pass. The opposite end of lever 112 is provided with a roller 116 adapted to rest between a stationary cam ring 117 and an adjustably mounted cam lever 118.

The cam ring 117 and one of the cam plates 109 are supported on a spider frame 119 secured to the end of stud bolt 84, and the other cam plate 109 is supported on a plate 120 secured to one of the channel irons 78. The cam lever 118 is pivoted at one of its ends at 121 to the spider frame 119 and at its opposite end at 122 to the lower end of a downwardly projecting rod 123, which is slidably mounted in a casing 124 secured to the spider frame 119. The upper end of rod 123 is threaded to receive the adjusting nut 125, which rests on the top of casing 124. The cam lever 118 is adapted to be adjusted inwardly and outwardly on the pivots 121 and 122 in the following manner. Headed pins 126 are threaded respectively into the spider frame 119 and the end of rod 123 and mounted to rotate on said pins are exteriorly threaded sleeves 127 interposed respectively between the heads of said pins and the face of spider 119 and the face of rod 123. The opposite ends of the cam lever 118 are threaded on the sleeves 127, as more clearly shown in Figures 4 and 5. By the foregoing recited construction it will be obvious that the lever 118 may be adjusted inwardly or outwardly on the sleeves 127 by turning said sleeves in the proper direction, and that said sleeves may be clamped firmly between the heads of pins 126 and their respective supports by an adjustment of said pins, thus enabling an operator to vary the point of contact between the lever 118 and the roller 116 on lever 112. It will also be obvious that by a manipulation of the nut 125 on rod 123 the distance between said lever and the cam ring 117 may be varied at will.

When the beet gripping and pulling jaws 105 have become automatically adjusted to a beet and while they are projected into the beet and the beet is being pulled from the ground it is desirable that the mechanism should be firmly locked in said adjusted position. To this end I provide a knife disc 130, which is mounted on the frame 94' and adapted to engage during this operation of the gripping and pulling mechanism with V shaped rack teeth 131 secured to plate 120.

As the wheel 85 revolves in the direction indicated by the arrow in Fig. 1, by frictional contact with the ground, the frame 94' is held from descending rapidly toward the ground and in adjusted relation to a beet, by means of the cam tracks 133, which are supported on the frame C, and upon which the rollers 100 rest; and in order to positively move said frame downwardly to engage the presser foot member 115 upon the top of a beet, the cam rolls 134 are adapted to engage with the top peripheral surfaces of rollers 100 and are yieldingly mounted on spring arms 135, which are secured to frame C.

After the beets are pulled from the ground and are carried upwardly by the wheel 85, the rollers 100 become engaged with cam tracks 136, which serve to adjust them with reference to a topping mechanism 137, and the cam track 117 acts upon the roller lever 112 to draw the presser foot 115 away from the top of the beet and the foliage thereon.

The topping mechanism 137 is supported by means of a pair of inclined struts 139, which are pivoted at their lower ends at 140 to the frame C, and an inclined hollow strut 141 which projects upwardly from a housing 142 which is pivotally mounted on a hollow standard 143 secured to frame C. The upper end of strut 141 terminates in a housing 144 having oppositely disposed transverse hollow arms 145 extending therefrom.

The upper ends of struts 139 have secured thereto a transverse bar 146 provided with longitudinally disposed arms 147 and 148. The arms 145 are pivoted in sockets 149 formed in the ends of arms 147 and extend outwardly therefrom and have pivoted thereto the housings 150, the opposite ends of which are pivoted in sockets on the arms 148.

Depending from the bottom of each housing 150 are the sleeves 151, 152 and 153, which radiate from the pivotal center thereof, and journaled therein are the shafts 154, 157 and 156 upon which are mounted the dish shaped cutting discs 158, 159, and 160. Mounted on the upper end of shaft 154 is a bevel gear 161, which meshes with a bevel gear 162 secured to shaft 157, and mounted on shaft 156 is a beveled gear 163 which meshes with gear 161; and also mounted on the top of shaft 156 is another gear 164 which meshes with a gear 165 secured to the transverse shaft 166 journaled in bearings in extensions 145.

Secured to shaft 166 is a gear 167 which meshes with a gear 168 secured to the upper end of a shaft 169 journaled in strut 141, and secured to the lower end of said shaft is a gear 170, which meshes with a gear 171 secured to a horizontally disposed shaft 172 journaled in bearings in extensions 173 projecting transversely from casing 142. Secured to the ends of shaft 172 are the toothed discs 174 adapted to engage with the severed foliage of the beet and direct the same out to an apron 175 mounted on frame C.

Mounted in suitable bearings in standard 143, is a shaft 177 provided at its top with a gear 178, which meshes with gear 171, and secured to the lower end of said shaft is a gear 179 adapted to mesh with a gear 180 secured to a shaft 181 journaled in bearings mounted in frame C. Secured to the inwardly projecting end of shaft 181 is a bevelled gear 182 adapted to mesh with a gear 183 secured to a horizontally disposed shaft 184 mounted in suitable bearings in frame C, and secured to each end of said shaft are the spur pinions 185 adapted to mesh with spur gears 186 secured to the hubs 86 of the wheels 85.

Mounted loosely on shaft 181 are the miter gears 187, which are centrally disposed with respect to apron 175 and rest between the two legs thereof, and secured to a transversely disposed shaft 189 mounted in bearings in frame C is a miter gear 190 adapted to mesh with the gears 187, as more clearly shown in Fig. 8 of the drawings. Secured to the outwardly projecting end of shaft 189 is a miter gear 191 adapted to mesh with miter gear 192 secured to a shaft 193 journaled between two side bars 194 in a bearing secured thereto, and having mounted upon its oppositely disposed ends the pulleys 195 over which the apron 175 passes. The apron 175 is also supported at its opposite end and passes over pulleys 196 mounted on the shaft 197.

Mounted to slide on shaft 181 and arranged between the miter gears 187 and adapted to be caused to rotate therewith by means of a key 198 secured to said shaft, is a clutch member 199, which is adapted to be moved into clutching engagement with either of said miter gears 187 by means of the yoke 200 secured to a rod 201 slidably mounted in side bars 194. One end of rod 201 is pivoted at 202 to an upstanding lever 203, which is pivoted at 204 to upright 143 and has pivoted at 205 at its upper end the shifting lever 206, said shifting lever being provided with suitable notches 207 adapted to engage over the hopper like extension 208 of one of the side bars 194.

By the foregoing recited arrangement of gearing it will be apparent that upon revolution of either or both of the wheels 85 motion will be imparted to beet cutting discs 158, 159 and 160 in the directions indicated by the arrows in Fig. 2 of the drawings, and that also motion will be imparted to the toothed discs 170 in the direction indicated by the arrow, thus causing said discs to pick the severed and wasted portion of the beets from off the gripping and pulling mechanism and to deliver the same onto the apron 175. By this string of gears and by the proper manipulation of shifting lever 206 it will be obvious that the apron 175 may be caused to remain stationary as illustrated in Fig. 8, or that the top leg of said apron may be caused to move transversely towards either side of the machine. By this arrangement it will be obvious that the operator may allow a quantity of the waste beet ends to accumulate on the apron 175 and by a manipulation of lever 206 may dump this waste material at intervals on the ground at the desired side of the machine.

Supported on the channel irons 78 and by means of upwardly extending struts 209 and arranged between the two sides of wheels 85 and under the beet cutting discs at one end and extending rearwardly and upwardly are the side bars 210 and mounted in between said side bars on rollers 211 and 212 and adapted to form a movable bottom between said side bars is an endless apron 213, said apron being driven by means of pinions 214 secured to the shaft 215 of roller 211 and being adapted to mesh with the gears 186 mounted on the hubs of wheels 85. By this arrangement it will be seen that when the beets are severed by the cutting discs 158 and 159, they will ride upon the upper surfaces of said discs and will be picked up by the discs 160 and delivered on the apron 213 and from there delivered into a wagon adapted to follow the machine or into suitable sacks attached to the end of the side bars 210.

When it is desired to adjust the cutting discs upwardly with reference to the pulling and gripping mechanism in order that they may be projected in close proximity with the gripping jaws, the strut members 139 are provided with turn buckles 216, which when properly manipulated will cause the discs to swing around the shaft 172; and in order to adjust the cutting discs forwardly and rearwardly with reference to the cam plates 109, I provide the hand wheels 217, the stems 218 of which are journaled in lugs mounted on transverse bar 146, said stem being provided with collars 219 arranged on each side of said lug and being threaded at their ends into sockets 220 pivoted at 221 to the housings 150. By this arrangement it will be seen that the cutting discs may be swung in either direction around the center of rotation of shaft 166.

In Figures 13, 14 and 15 I have shown a series of diagrammatic views illustrating various steps in the operation of the beet gripping and pulling mechanism when becoming adjusted to and projected into a beet, and when in this position the frame 94' is held a predetermined distance above the surface of the ground by means of the tracks 133, and as a consequence the gripping jaws 105 and the pivotal point 111, will also be held a predetermined distance above the ground. The presser foot 115 supported on the lever 112 which is pivoted at 111, is held upwardly adjacent the frame 94' by means of the cam track 117 and when contacting therewith, as shown in Fig. 13 will also be a predetermined distance above the ground. As the frame 94' rides downwardly on tracks 133, the roller 116 contacts with cam lever 118 and consequently the presser foot 115 will descend at a varying speed to that of the gripping jaws 105, until the entire mechanism has been arrested in its descent by reason of the presser foot contacting with the top of a beet, as shown in Fig. 15 of the drawings. The ratio of the speeds of these members is determined by the lateral adjustment of the cam lever 118 with respect to the point of contact of the roller 116 therewith, and when said ratio is once established the gripping jaws 105 will always descend to the same relative position opposite a beet, regardless of the distance said beet projects above the ground.

At certain seasons of the year a hard knot D (see Figures 13, 14 and 15) forms on the top of the beets and it is desired to eliminate this part of the beet before the ratio of speeds of the presser foot and gripping jaws is started, and to this end the vertical adjustment of the cam lever 118 is provided. It is also desirable to use this adjustment of the cam lever 118 in order to provide for the sinking of the wheels 85 in the ground.

By the above recited construction it will be seen that the cam lever 118 may be adjusted by means of the sleeves 127 to regulate the point of contact of the roller 116 therewith in order that the beets will be gripped by the jaws at any desired proportionate distance between the ground line and the top of the beets, and that also by an adjustment of the hand nut or wheel 125 while the machine is in motion, any desired part of the top of the beet may be eliminated from said proportionate calculation; and as stated before the hand wheel 125 may be manipulated to adjust the lever 118 to compensate for the wheel 85 sinking into the ground below the level of that part of the surface thereof above which the beets project.

The operation of the machine is as follows: The machine is drawn over the ground in the direction indicated by the arrow, and the wheels 85 carrying the beet gripping and pulling device rotate in the direction indicated by the arrow through frictional contact with the ground. When the rollers 100 on the frame 94' come in contact with the cam rollers 134, the particular frame is approximately above the beet to be operated upon. Upon continued movement of wheels 85 the rollers 100 are forced downwardly by means of the cam rollers 134 and consequently the frame 94' carrying the gripping jaws 105 and the presser foot 115 moves toward the beet. When the roller 116 on lever 112 contacts with cam lever 118, the gripping jaws and the presser foot continue to move downwardly but at different speeds, said ratio of speed being determined as stated before by an adjustment of the cam lever 118. When the presser foot 115 strikes the top of the beet, the entire frame 94' is arrested in its downward movement and the presser foot 115 is held against the beet by means of the yielding movement of the cam rolls 134.

Upon continued movement of the wheels 85, the rollers 108, which operate the gripping jaws 105, are caused to ride in the cam plates 109, as more clearly shown in Fig. 12 of the drawings, and are thereby drawn together, thus causing said gripping jaws to be projected into the beet, as more clearly shown in Figures 5 and 15 of the drawings; and as the wheels 85 continue to move, the beet is drawn from the ground. During this operation the plow points 52 are adapted to engage underneath the beet and loosen the ground therearound, thus relieving all abnormal strain upon the gripping jaws. The beet is carried upwardly in gripped relation with the jaws 105, and during this movement the rollers 100 become engaged with the cam tracks 136, which act to present all of the gripping jaws in an exact relation just below the topping mechanism 137, and during this operation, the roller 116 becomes engaged with the cam track 117, which serves to pull the presser foot 115 away from the top of the beet and foliage thereon, as more clearly shown in Fig. 4 of the drawings. As the beets are carried forwardly they are presented to the crotch between the cutting discs 158 and 159 and are thereby severed, the main portion of the beet being carried and delivered onto the beet conveyor apron 213 by means of the cutting discs 159 and 160, as previously described. After the beets have been severed the jaws 105 are spread apart to release the top of the beet by means of the cam plates 109, as more clearly shown in Figures 4 and 11 of the drawings.

As the wheels 85 continue in their movement, the top severed portion of the beet carrying the foliage is carried forward and downwardly, and becomes engaged with the teeth of revolving discs 174 and is thereby removed from the pulling mechanism and delivered upon the foliage conveyor apron 175 and from there delivered as stated before to the ground or any suitable receptacle mounted at the ends of said apron.

As previously stated, when the machine is being turned around or transported from one field to another, mechanism is provided for lifting the plow members above the surface of the ground, and during this operation the frame B of the plow members becomes engaged with the frame C of the pulling mechanism wheels 85, and thereby lifts said mechanism free and clear above the ground.

What I claim is:

1. A beet harvesting machine, comprising a pulling mechanism adapted to grasp a beet proportionate to that part which projects above the ground, means for adjusting the ratio of said proportion, a topping mechanism, and means for presenting the pulling mechanism in uniform relation to said topping mechanism, whereby the same proportionate amount of the beet will always be cut away.

2. A beet harvesting machine, comprising a mechanism for gripping a beet at any predetermined proportional distance between its top and the ground, and means for operating said mechanism.

3. A beet harvesting machine, comprising mechanisms for pulling a beet and severing it at any predetermined proportional distance between its top and the ground, and means for operating said mechanisms.

4. A beet harvesting machine, comprising a beet pulling device provided with a pair of reciprocating members co-operating with each other to reciprocate at different speeds, one of said members being adapted to contact with the top of a beet and the other of said members being provided with means for gripping a beet, means for varying the ratio of speeds of said members, and means for operating said members.

5. A beet harvesting machine provided with a conveyor, a plurality of beet pulling mechanisms mounted to reciprocate on said conveyor, each of said pulling mechanisms comprising a frame, a pair of oppositely disposed gripping members pivoted on said frame, a lever pivoted to said frame, a presser foot attached to said lever, means adjustably supported on said conveyor for moving said frame and lever at different ratios of speeds, and means supported on said conveyor for opening and closing said gripping members.

6. A beet harvesting machine provided with a conveyor adapted to rest upon the ground, a plurality of beet pulling mechanisms mounted on said conveyor, and means for adjusting said pulling mechanisms on said conveyor with reference to that part of said conveyor which rests upon the ground.

7. A beet harvesting machine provided with a conveyor, a plurality of beet pulling mechanisms mounted to reciprocate on said conveyor, means for positioning said pulling mechanisms in adjusted relation with a beet, and means for locking said pulling mechanisms in said adjusted relation during a beet pulling operation.

8. A beet harvesting machine, comprising a pulling mechanism adapted to grasp a beet proportionate to that part which projects above the ground, means for adjusting the ratio of said proportion, and means for operating said mechanism.

9. A beet harvesting machine, comprising a mechanism for pulling and severing a beet, means for adjusting said mechanism whereby said beat may be severed at any predetermined place, and means for operating said mechanism.

In witness that I claim the foregoing I have hereunto subscribed my name this 18th day of October, 1920.

SAMUEL C. BEALE.